April 22, 1952 H. GARDERE 2,594,007

TWO-WAY SIGNAL REPEATER

Filed June 4, 1948 2 SHEETS—SHEET 1

INVENTOR
HENRI GARDÈRE
By Adams & Bush
ATTORNEYS

April 22, 1952 H. GARDERE 2,594,007

TWO-WAY SIGNAL REPEATER

Filed June 4, 1948 2 SHEETS—SHEET 2

INVENTOR

HENRI GARDÈRE

By Adams & Bush

ATTORNEYS

Patented Apr. 22, 1952

2,594,007

UNITED STATES PATENT OFFICE 2,594,007

TWO-WAY SIGNAL REPEATER

Henri Garderè, Paris, France, assignor to Compagnie Industrielle des Telephones, Paris, France, a corporation of France Application June 4, 1948, Serial No. 31,084
In France June 26, 1947

11 Claims. (Cl. 179—16)

The present invention has for its object a device for the retransmission of low frequency currents utilised for signalling over telephone lines with two wires.

Such devices, commonly called "low frequency signalling sets" are most often formed, in a manner already known, by two symmetrical groups of electro-mechanical relays, respectively ensuring the relaying of the signalling in the two directions of transmission.

When a low frequency signal arrives travelling in one direction on one of the lines, it starts the first relay of the corresponding group; the last relay of that group then branches on to the other line a low frequency generator, usually of the same frequency as the incident signal. Moreover, one of the relays of the operating group blocks the relays of the other group in order to avoid a return of signalling or setting up oscillations.

Signalling sets are also known in which the first relay of the groups above mentioned is replaced by a triode vacuum tube, or by a triode gas-filled tube with a heated cathode, known as a thyratron.

However, in all these known devices, a certain number of electromechanical relays are still necessary.

The signalling set which is the object of the present invention utilises gas-filled tubes with a control grid, avoiding any mechanical part, in order to ensure the transmission of the signals in both directions, on a line of two wires, without setting up oscillation or a return of the signal.

All the operations which, in the known devices, are ensured by a group of relays assigned to one direction of retransmission, are in the present invention thus fulfilled by a single gas-filled tube, comprising three or more electrodes. The complete signalling set, therefore, only comprises, as essential parts, two tubes, plus, in certain cases, a third auxiliary tube, and excludes any part which is not purely electronic.

The present invention is distinguished by the fact that it requires, for each transmission direction, a thyratron of which the grid circuit comprises a source of negative polarisation and a resistance fed by the incident signal current rectified so that, when a signal arrives, a higher voltage is developed at the terminals of this resistance and in an inverse direction to the negative tension of polarisation, the plate-circuit of the thyraton comprising a source of alternating voltage of a low frequency equal to that of the signal current it is desired to transmit, and a transformer the secondary of which feeds the portion of line which is "downstream" from the device, this device comprising, moreover, means for blocking the other thyratron which does not transmit the signal.

Figure 1:
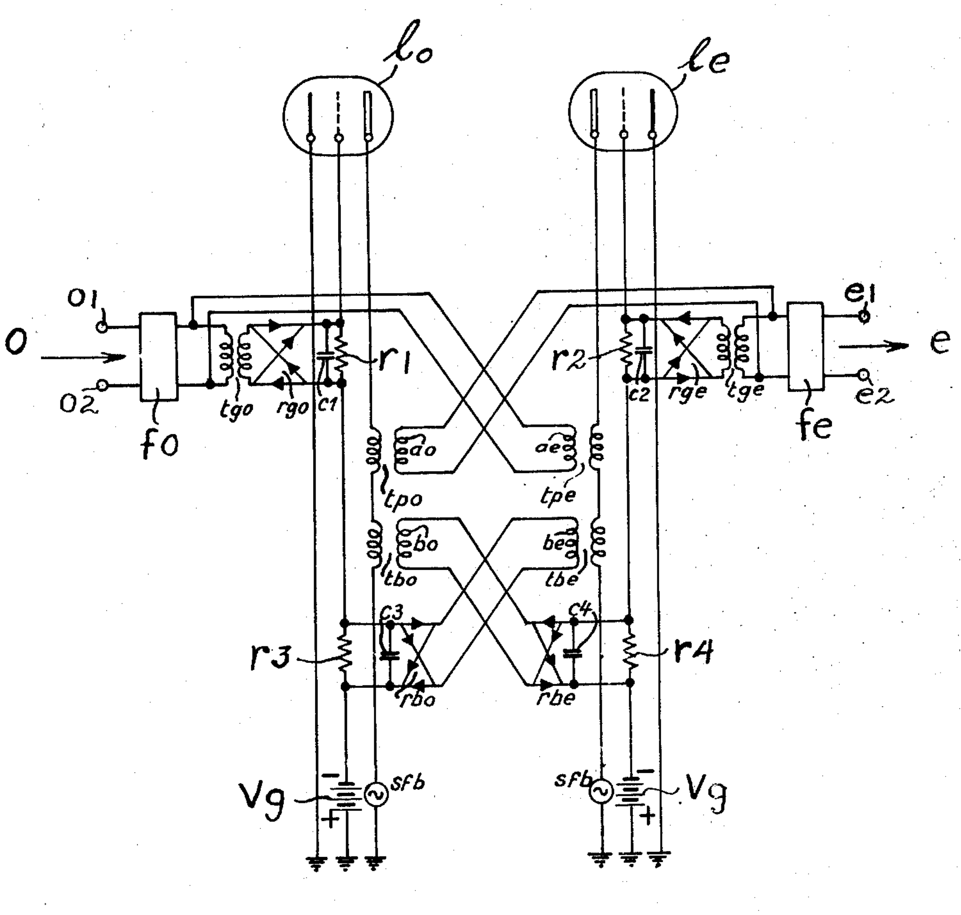

Figure 1 represents a first example. O and *e* designate the extremities of the signalling system. They are connected respectively at O1, O2, and *e*1, *e*2 to the extremities of the two lines forming part of the two wire circuit (in parallel or in series with the extremities of the repeater, not represented, connecting the two lines); *fe, fo* are the filters allowing only the signalling frequency to pass; *tgo, tpo, tbo, tge, tpe, tbe,* are transformers operating for the signalling frequency; *rgo, rge, rbo, rbe,* are rectifiers. *lo* and *le* are gas-filled triodes with cold or heated cathode; the anode of the triodes *lo* and *le* is fed by an alternating source S*fb* of low frequency, the frequency equal to that of the signalling (this source is represented in duplicate for simplicity in the diagram).

The grids are polarised negatively by a source *vg*, so that in the absence of a signal none of the tubes can be lit by the voltage from the source of the anode S*fb*. The operation is as follows:

Let us suppose that a signal consisting of a train of alternating waves of the signalling frequency presents itself at O. It passes into the filter *fo*, into the transformer *tgo*, is rectified in the rectifier assembly *rgo*, and gives into the grid circuit of the lamp *lo*, at the resistance terminals *r*1, a continuous constant positive voltage, the alternating components of the rectification being short-circuited by the condenser C1. Under the effect of this positive polarisation voltage thus applied to the grid, which voltage cuts itself off from the *vg* battery voltage, the tube *lo* lights up during each positive half-cycle from the source S*fb*. The periodic current thus produced delivers into the transformer winding *ao* of the transformer *tpo*, an amplified alternating current which, after having passed through the filter *fe* suppressing its harmonics, is emitted at the extremity *e*, thus ensuring the retransmission of the signal.

Reduced to the portion described above and completed by symmetry for the other direction of transmission, the device would not operate correctly. Indeed, the current retransmitted on the side *e* would cause a positive polarisation of the grid of *le* by the intermediary of *tge* and *rge*, lighting up the tube *le* in the same manner as *lo*, resulting in return of signalling or the setting up of oscillations.

To remedy this, there is provided, as in known signalling sets with electro-mechanical relays, a blocking of the retransmission system which has to remain idle.

This blocking operates in the following manner: the winding *bo* of the transformer *tbo*, previously explained, is the source of an alternating voltage which, through the rectifier *rbe*, delivers across the terminals of the resistance *r4* a negative direct voltage smoothed out by C4, continuous negative. This negative voltage blocks the tube *le*, that is, it prevents it from lighting up. In other words, the transformers *tpo*, *tbo* and *tge* are provided in order that the positive voltage in the grid circuit of *le*, at the terminals of *r2*, due to the signal retransmitted towards *e*, may be lower than the negative voltage introduced into the same grid circuit by the blocking device (*bo*, *rbe*, *c4*) at the terminals of the resistance *r4*.

This device is completed by symmetry, as indicated in Figure 1, for retransmission in the direction *e*–O.

The system described allows therefore of the retransmission of the signalling in both directions without any mechanical part.

Figure 2:
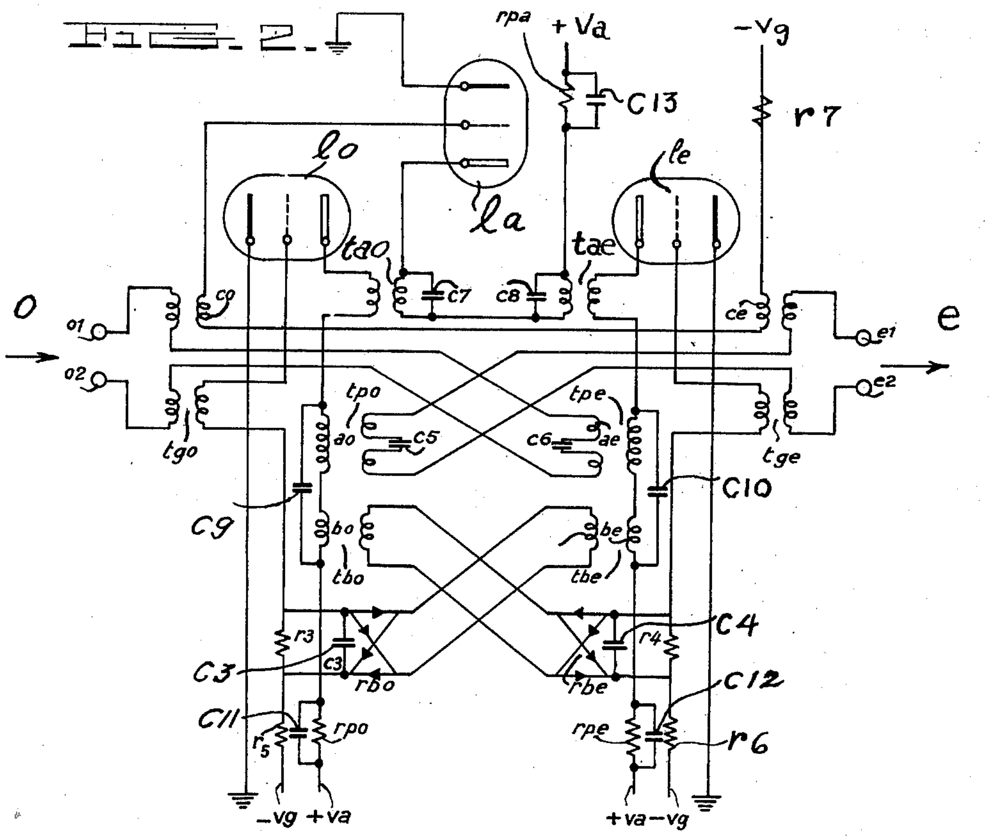

Figure 2 represents the plan of another example, of a signalling set according to the present invention. In this example, one utilises a third gas-filled tube *la*, but whereas, in the preceding example, it was necessary to utilise an anode source S*fb* alternating in the frequency of the signals, here one utilises a continuous anode source *va* which may be the common anode source of the repeaters of a station.

The parts having the same markings as in the preceding example have the same functions. The other parts cooperate in the alternate extinguishing and lighting, at the signal frequency, of the tube which ensures the retransmission. Moreover, the filters *fo* and *fe* are eliminated and replaced by the filtering effect obtained by the tuning in resonance of the primaries of the transformers *tgo* and *tge*, with the condensers C5 and C6.

The rectifiers *rgo* and *rge* are eliminated from the secondaries of *tgo* and *tge*, so that it is no longer a continuous voltage which the received signals produce on the grids of *lo* and *le*, but the alternating voltage itself of the signal, more or less amplified according to the transformation ratio. Moreover, the transformers *tgo* and *tge* each comprise a tertiary winding *co* and *ce*, which are introduced in series, in the grid circuit of the auxiliary tube, *la*, with a resistance *r7*. The grid polarisation of this lamp is ensured by a voltage *vg*, as for the tubes *lo* and *le*.

Resistances *r5*, *r6* may be provided in the grid circuit to limit the grid current of tubes *lo* and *le*.

The anode of the tube *la* is coupled with the anodes of the tubes *lo* and *le* by the intermediary of the auxiliary transformers *tao* and *tae*. Resistances *rpo*, *rpe* and *rpa* are provided to limit the anode currents. The anodes are fed by a positive voltage + *va*. Finally, in the three anode circuits, the transformers or the resistances are shunted by Condensers $C_7$, $C_8$, $C_9$, $C_{10}$, $C_{11}$, $C_{12}$ and $C_{13}$. These parts, which did not exist in the system described in the first example, constitute, as stated above, the device which allows of the alternating lighting and extinguishing of the tubes *lo* or *le*, which retransmit the signals. It is indeed known, that once lighted, a gas-filled tube with continuous voltage from the anode voltage source *va*, cannot be extinguished whatever may be the variations of the grid voltage.

This device of Figure 2 operates in the following manner: Let us suppose that a signal must be retransmitted in the direction *o*–*e* and that the first alternation of the signal has lighted the tube *lo* by the induction of a positive voltage in the grid circuit. Simultaneously, as a consequence of the direction in which the winding Co is wound, a negative voltage was induced in the grid of *la* which therefore could not light up.

With the next half-cycle of the incoming signal, the voltages induced in the grids of tubes *lo* and *le* take on inverse polarities. Thereupon, the tube *la* lights up. On its lighting up, by reason of the negligible internal resistance of the gas-filled tubes and of the presence of the capacities $C_7$, $C_8$ and $C_{13}$, through which the anode circuit may close, a point of excess anode current is produced. This excess current in the anode circuit of tube *la* at that instant induces in the anode circuit of the anode of tube *lo*, through the intermediary of *tao*, a voltage opposed to and higher than *va*. This tube becomes extinguished and, as its grid voltage is at this instant more negative than $-vg$, it remains extinguished as long as the second half-cycle of the signal alternating current lasts.

At the next half-cycle, tube *lo* lights up again and extinguishes tube *la* by the same phenomenon of excess anode current in the anode circuit of tube *lo* which induces a current in the anode circuit of tube *la* through transformer *tao* and the condensers $C_9$ and $C_{11}$. And so on for as long as the alternating signal lasts which is applied to terminals $O_1$, $O_2$ Otherwise, the retransmission of the signals and the blocking of the reverse line take place as in the preceding example.

Figure 3:
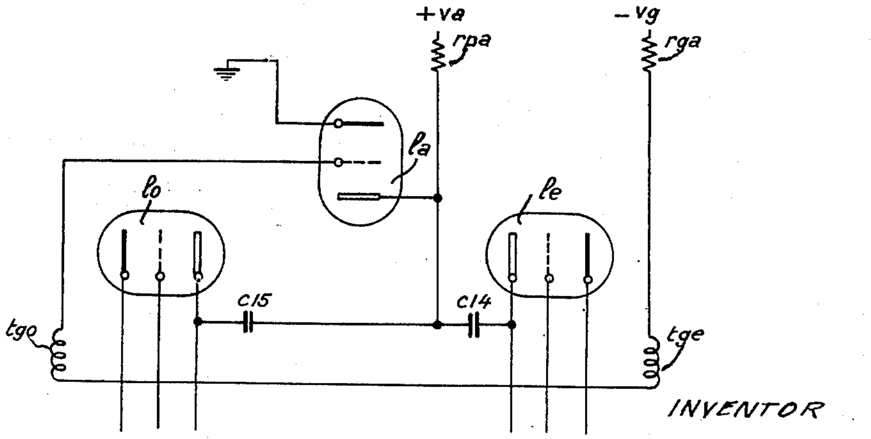

Figure 3 represents a variation of the preceding example as far as concerns the device for the cyclic extinction of the tubes *lo* or *le*. The cyclic extinction of the tubes at the signaling frequency is ensured by the coupling of the anodes of *le* and *lo* by the capacity $C_{15}$, and of the anodes of *la* and *le* by the capacity $C_{14}$, instead of the inductive coupling by the transformers *tao* and *tae* of Fig. 2. Accordingly, only the tubes and the coupling of the anodes are shown, the rest of the plan being the same as in the preceding example.

The extinguishing is made by the following operation: Assume that a signal is being applied to the terminals $O_1$ $O_2$ and that tube *lo* lighted up; its anode potential is equal to the voltage drop in the tube *lo*, therefore small before the voltage of *va*. On the contrary, the tube *la* being extinguished, its anode potential is equal to *va*. Condenser $C_{15}$ is therefore charged. If tube *la* lights up, the voltage becomes zero across the terminals of condenser $C_{15}$, which discharges itself into the two tubes *lo* and *la* in series, confirming the lighting of *la* and extinguishing *lo*, for the discharge current circulates in an inverse direction in this tube *lo* and cuts off the lighting current in the anode circuit of tube *lo*. And so on for the successive alternations of the signal at the signaling frequency.

All the examples described make use of gas-filled tubes with three electrodes, but it is clear that one may, without overstepping the limits of the invention, utilise tubes allowing of a greater number of electrodes. These tubes may have either a cold cathode or a heated cathode. The heating circuits have not been shown in the plans.

The arrangements according to the invention apply to the retransmission of signals constituted by trains of low frequency waves. Those which are fed under continuous anode voltage may transmit signals of several frequencies, which allows of increasing their practical possibilities for utilisation.

Having now particularly described and ascertained the nature of my said invention and in what manner the same is to be performed I declare that what I claim is:

1. In a device for retransmitting signals, two paths connected in parallel between two sections of a two wire telephone line, and each adapted to transmit the signals in one direction, on each channel a rectifier bridge and an input transformer whose primary is connected to the end of one of the sections of the line and whose secondary is connected, through the intermediary of said rectifier bridge, to the terminals of a resistance inserted in the grid circuit of a thyratron, a source of direct voltage negatively biasing the said grid circuit in such manner as to prevent the ignition of the thyratron in the absence of received signal received on the input transformer, and, in the anode circuit of the said thyratron, a source of alternating current of low frequency in series with the primary of an output transformer whose secondary is connected to the end of the other section of the line; the anode circuit of the thyratron of each of the said channels comprising further the primary of a transformer whose secondary is connected, through the intermediary of a bridge of rectifiers to the terminals of a resistance inserted in the grid circuit of the thyratron of the other, so as to prevent the ignition of the latter thyratron when the first is ignited.

2. A device for retransmitting signals inserted between two sections of a two wire telephone line, comprising on the one hand, for the one of the directions of transmission an input transformer whose primary is connected to the end of one of the sections of the line and whose secondary is inserted in series in the grid circuit of a thyratron, a source of direct voltage negatively biasing the said grid circuit in such manner as to prevent the ignition of the thyratron in the absence of signal received on the input transformer, and, in the anode circuit of said thyratron a source of direct voltage in series with the primary of an output transformer whose secondary is connected to the end of the other section of the line, and on the other hand a second path identical with the first, symmetrically arranged for the other direction of transmission, the anode circuit of the thyratron of each of said paths comprising further the primary of a transformer whose secondary is connected, through the intermediary of a rectifier bridge, to the terminals of a resistance inserted in the grid circuit of the thyratron of the other path, in such manner as to prevent the ignition of this last thyratron when the first is ignited, the retransmitting device comprising further a third thyratron in the grid circuit of which are connected two windings coupled respectively to the primary winding of the input transformer of each of the two paths, the direction of these windings being such that when a positive signal is applied to the input transformer, a negative signal is applied to the grid of the third thyratron and inversely, the anode circuit of the said third thyratron comprising a coupling with the anode circuits of the two other thyratrons, in such manner, that when the said third thyratron is ignited, it induces in the said anode circuits a negative voltage which in absolute value exceeds the positive voltage of the sources of continuous current connected to the said anode circuits.

3. A device according to claim 2, comprising two transformers whose primary windings are connected in series in the anode circuit of the auxiliary thyratron, and the secondary windings are connected respectively in the anode circuits of the two other thyratrons.

4. A device according to claim 2, comprising two condensers connected respectively between the anode of the auxiliary thyratron and the anode of each of the other two thyratrons.

5. In a two-way device for retransmitting signals, a first pair of line terminals, a second pair of line terminals, a first gas filled triode, a second gas filled triode, a source of negative direct current bias voltage connected for biasing the grid of each of said triodes, means for deriving from the signal incident on said first pair of line terminals a derived voltage and applying the same to the grid of said first triode in series with the source of negative grid bias therefor, a source of anode potential for each said triode, first translating means comprising a transformer for deriving a portion of the output of the anode circuit of said first triode and delivering the same to said second pair of line terminals, first blocking means comprising a transformer and a rectifier for deriving a portion of the output of the anode circuit of said first triode and rectifying the same and applying the so rectified derived voltage to the grid of said second triode with negative blocking polarity in series with the source of negative bias voltage therefor, means for deriving from the signal incident on said second pair of line terminals a derived voltage and applying the same to the grid of said second triode in series with the source of negative grid bias therefor, second translating means comprising a transformer for deriving a portion of the output of the anode circuit of said second triode and delivering the same to said first pair of line terminals, and second blocking means comprising a transformer and a rectifier for deriving a portion of the output of the anode circuit of said second triode and rectifying the same and applying the so rectified derived voltage to the grid of said first triode with negative blocking polarity in series with the source of negative bias voltage therefor.

6. In a two-way device for retransmitting low frequency signals, a first pair of line terminals, a second pair of line terminals, a first gas filled triode, a second gas filled triode, a source of negative direct current bias voltage connected for biasing the grid of each of said triodes, means for deriving from the signal incident on said first pair of line terminals a derived voltage and applying the same to the grid of said first triode in series with the source of negative grid bias therefor, an anode circuit for said first triode, a direct current source of anode potential for each said triode connected in its said anode circuit, an auxiliary source of anode potential for each said triode periodically producing positive cyclic pulses of current at the frequency of the incoming low frequency signal and being connected in its said anode circuit in series with the said direct current source thereof, first translating means comprising a transformer for deriving a portion of the output of the anode circuit of said first triode and delivering the same to said second pair of line terminals, first blocking means comprising a transformer and a rectifier for deriving a portion of the output of the anode circuit of said first triode and rectifying the same and applying the so rectified derived voltage to the grid of said second triode with negative blocking polarity in series with the source of negative bias voltage therefor, means for deriving from the signal incident on said second pair of line terminals a derived voltage and applying the same to the grid of said second triode in series with the source of negative grid bias therefor, second translating means comprising a transformer for deriving a portion of the output of the anode circuit of said second triode and delivering the same to said first pair of line terminals, and second blocking means comprising a transformer and a rectifier for deriving a portion of the output of the anode circuit of said second triode and rectifying the same and applying the so rectified derived voltage to the grid of said first triode with negative blocking polarity in series with the source of negative bias voltage therefor.

7. A device according to claim 6, said auxiliary source for each said triode being a source of alternating current of the frequency of the incoming signal.

8. A device according to claim 6, and a third gas filled triode, a grid circuit therefor comprising a source of negative direct current bias voltage, an anode circuit therefor comprising a source of anode potential, means for deriving from the signal incident on each said pair of line terminals a derived voltage and applying the same to the grid of said third triode in series with the source of negative direct current bias therefor, and said auxiliary source of each of said first and second triodes comprising complementary means for deriving energy from the anode circuit of said third triode and applying the same to the anode circuit of said first and second triodes respectively.

9. A device according to claim 8, said complementary means being a pair of transformers connected to couple the anode circuit of said third triode to the anode circuit of said first and second triodes respectively.

10. A device according to claim 8, said complementary means being a pair of condensers connected between the anode of said third triode and the anodes of said first and second triodes respectively and arranged to couple the anode circuit of said third triode to the anode circuit of said first and second triodes respectively.

11. A device according to claim 6, each said means for deriving from the signal incident on said first and second pair of line terminals a derived voltage and applying the same to the grid of said first and second triodes comprising an auxiliary bridge rectifier and an output resistance for said auxiliary rectifier in series in the grid circuit of said first and second triodes respectively.

HENRI GARDERÈ.

REFERENCES CITED

The following references are of record in the file of this patent:

UNITED STATES PATENTS

| Number | Name | Date |
|---|---|---|
| 1,510,676 | Johnson | Oct. 7, 1924 |
| 1,665,698 | Gorton | Apr. 10, 1928 |
| 2,016,261 | Wise et al. | Oct. 1, 1935 |
| 2,124,848 | Powell | July 26, 1938 |